United States Patent [19]

Heath et al.

[11] Patent Number: 5,267,724
[45] Date of Patent: Dec. 7, 1993

[54] FENCING APPARATUS FOR CONTAINING CATS

[76] Inventors: Buddy Heath; Georgia Heath, both of 758 Rancho Via, Sparks, Nev. 89434

[21] Appl. No.: 565,265

[22] Filed: Aug. 9, 1990

[51] Int. Cl.⁵ .......................................... E04H 17/00
[52] U.S. Cl. ...................................... 256/11; 256/12; 256/19; 119/15
[58] Field of Search ............... 256/11, 19, 1, 24, 73, 256/33, 32, 35, 12; 119/15, 20, 47

[56] References Cited

U.S. PATENT DOCUMENTS

| | | | |
|---|---|---|---|
| 258,701 | 5/1882 | Bower | 256/11 X |
| 1,546,094 | 7/1925 | Marbaugh | 256/11 |
| 2,015,615 | 9/1935 | Cuplinger | 256/11 |
| 3,439,455 | 4/1969 | Ford | 256/11 X |
| 3,771,767 | 11/1973 | Dougherty | 256/12 X |
| 3,806,095 | 4/1974 | Ford | 256/11 |
| 4,270,736 | 6/1981 | Burch | 256/12 |
| 4,348,012 | 9/1982 | McLoughlin | 256/12 |
| 4,361,313 | 11/1982 | Russell | 256/19 X |
| 4,673,166 | 6/1987 | MacDougall | 256/11 |
| 4,685,656 | 8/1987 | Lee et al. | 256/19 X |
| 4,916,433 | 4/1990 | ver Loren van Themaat | 256/12 X |
| 4,928,929 | 5/1990 | Kinder | 256/24 |

Primary Examiner—Peter M. Cuomo

[57] ABSTRACT

A novel apparatus and system for securing the integrity of an enclosure against escape or entry by cats. The invention provides a retrofit for common suburban fences which doesn't detract from the ambiance of the garden or injure the cats trying to get in or out.

17 Claims, 2 Drawing Sheets

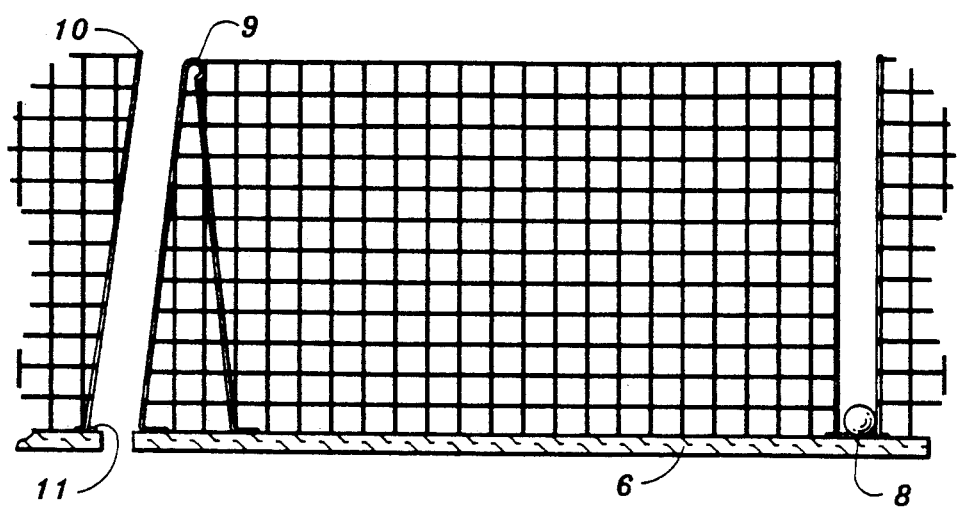
Fig. 3
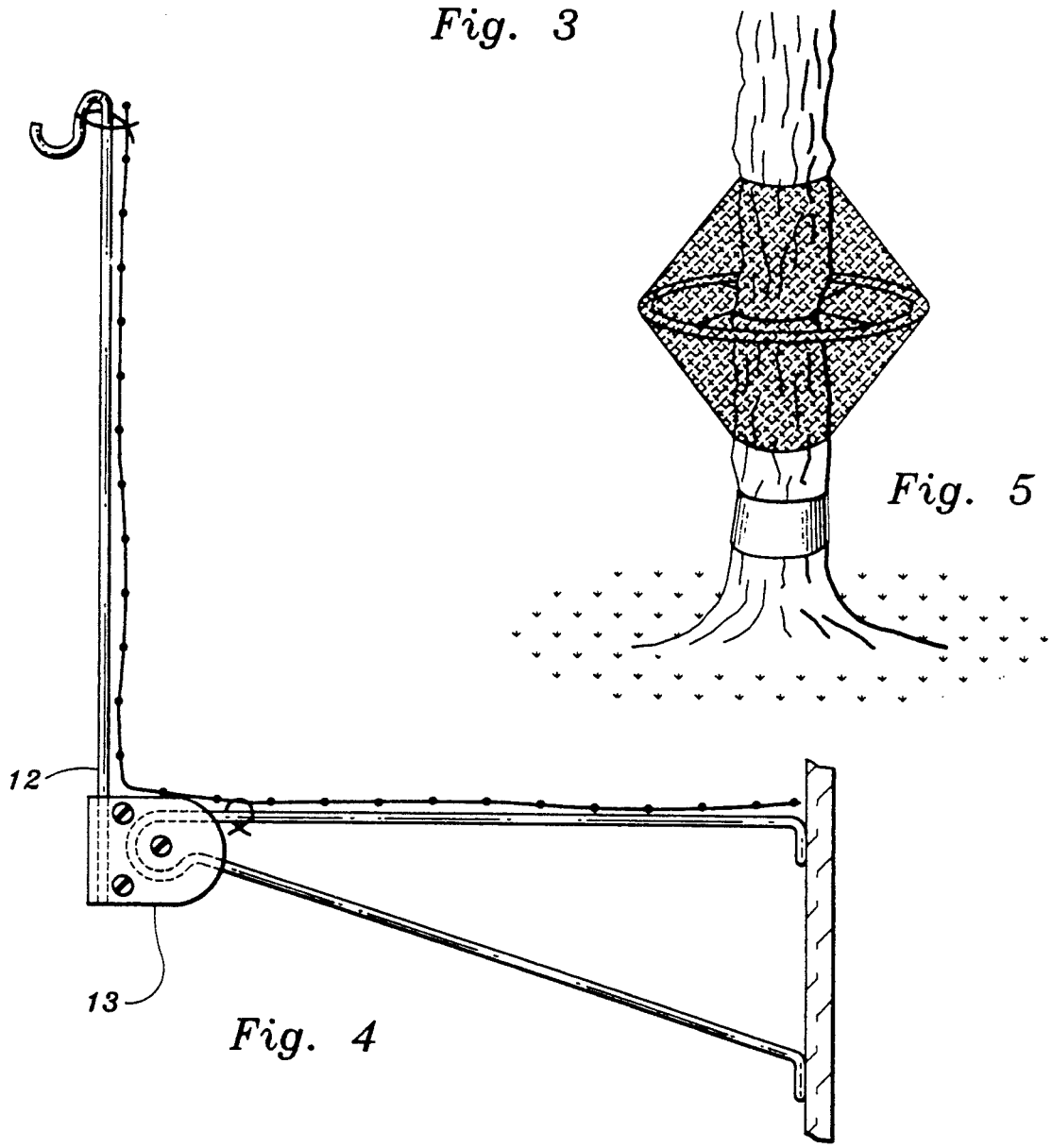
Fig. 4
Fig. 5

FENCING APPARATUS FOR CONTAINING CATS

FIELD OF THE INVENTION

This invention relates generally to the field of enclosures for animals such as pens and fences.

BACKGROUND OF THE INVENTION

For some time cat owners have tried to restrict the travels of their pets for a number of reasons. Most of which have to do with the safety of the animal. Many suburban streets are congested with traffic to the point of great danger if a cat should wander into the path of a car. A number of cat owners also wish to protect their investments in their pets which can be injured in fights with other cats or dogs or humans. Most of all, cat owners may find that their cats get lost when out of the confines of their back yard. The state of the art includes vertical fencing of boards spaced closely enough that a cat cannot pass through, and wire mesh or chicken wire small enough that a cat cannot climb through.

The problems with the present state of the art are many. Obviously, both types of fences must extend close enough to or under the ground so that cats will not be able to dig under the fence. Board fences provide more privacy for the suburban back yard, and more particularly grape stake and dog-eared fences are quite common for such purpose. Cats, however, climb up such fences by their claws and jump over the top.

A solution is of course a ceiling to the enclosure however such a solution is not practical except in limited area because the home owner generally doesn't want to enclose his whole back yard and the cost would be prohibitive. Further the lack of aesthetics of a roof on a yard would limit the market of such a product.

This invention overcomes these problems of the cat bounding to the top of the fence and over by placing a horizontal barrier at or near the top of a fence. By using thin gauge steel and very thin coarse mesh netting in a horizontal orientation, the invention doesn't detract from the ambiance of the fence. Being a retrofit of an existing fence that uses netting, thin gauge steel rods and cable, the invention is very economical.

OBJECTS OF THE INVENTION

A first object of the invention is to provide an enclosure that is highly resistant to escape by cats which does not detract from the aesthetics of the surroundings. A second object of the invention is to provide an enclosure that won't injure a cat engaged in diligent efforts to escape. A third object is to limit aesthetic impact on the ambiance of the garden. A fourth object is to add to the aesthetic beauty of the fence by providing a place to hang potted plants. This object is addressed by the arc at the end of the brackets.

SUMMARY OF THE INVENTION

These and other objects and advantages are provided by the invention including a plurality of brackets attached to a vertical fence having netting attached to the brackets and to the fence at regular intervals between the brackets close enough together that a cat can't force the netting from the fence and get through where the netting contacts the fence.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein: FIG. 3 is a top view of a system mounted on an outward opening gate; FIG. 4 shows another embodiment including a vertical brace and netting for preventing unwanted cats from entering the enclosure. FIG. 5 shows the system mounted about a tree.

DESCRIPTION OF PREFERRED EMBODIMENTS

Figure 1:
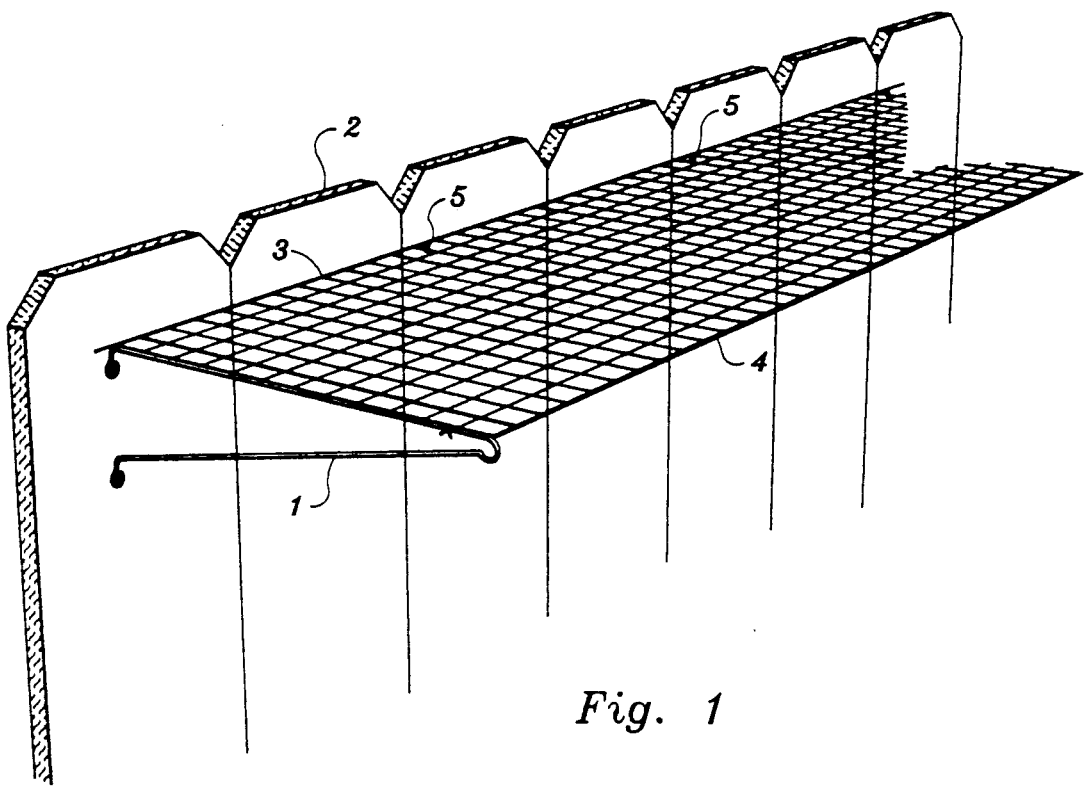
FIG. 1 is a system in place on a fence section.

Aspects of the invention have been tested in order to arrive at this preferred embodiment. First, as to the material of the netting, other materials were tried including fine wire mesh commonly known as chicken wire. However, the wire mesh was found to be too sturdy and eventually the cats gained confidence and jumped onto and over the wire. The present material, a polypropylene netting 4, has a necessary lack of rigidity which makes cats less confident in clinging thereto.

Initially, the netting was attached directly to the fence using staples but the cats, through great effort, were able to stretch the netting and force their way through the netting at its edge between the staples. This problem was solved by weaving the wire or cable 3 in the edge of the netting 4 and affixing the cable to the fence.

The dimensions of the bracket 1 were experimentally determined. It was found that shorter brackets could be jumped over, but a dimension of 16 inches provides adequate resistance to jumping from below and the added benefit of resisting other cats from entering the enclosure by jumping in from the fence top. The length of the bracket 1 balances the barrier characteristic against negative aesthetic impact.

The invention provides integrity of the enclosure against cats escaping the enclosure and unwanted cats entering the enclosure. As stated above, the netting 4 is apparently perceived as too unstable to hang on for cats trying to escape from below.

It is also apparently viewed as too unstable to walk on from above by cats trying to enter from without. The large mesh is of a size that doesn't provide uniform support to a cats foot. The bracket 1 diameter was chosen as a compromise between strength for withstanding a cat aggressively trying to escape and both aesthetic and unwanted cat resistance. Cats trying to enter the enclosure might just walk out on a bracket and jump into the enclosure if it were wide enough, but a diameter of 3/16" was chosen because it is narrower than most cats feet and apparently cats are not comfortable venturing to walk upon it. Furthermore, the bracket tends to vibrate under the weight of a cat causing cats to pause before walking thereon.

In an alternate embodiment, a vertical section of netting is attached to a vertical brace 12 at the end of the bracket 1 opposite the fence in such a manner that it can pivot in the plane of the bracket. This embodiment provides even more protection from unwanted cats entering the enclosure.

The invention includes special consideration for gates. If a gate swings into the enclosure, the bracket nearest the hinges on the gate and on the fence must cooperate so that they don't impede the swing of the gate. Most importantly they must be close enough together when the gate is closed that a cat doesn't squeeze out between the two brackets. At the opposite end of the gate it is important again that the two brackets are close but don't impede the swing of the gate.

For a gate opening outward the prime consideration is for the end of the gate opposite the hinges where the arc of the gate could cause a bracket perpendicular to the plane of the gate to hang up on the fence. The invention's solution to this problem is to bend the bracket and its nearest counter part on the fence so that they conform slightly to the arc of the gate.

The inventive system also includes attaching netting to a trunk of a tree and lower limbs and bloused outward and upward from trunk to the branches to prevent cats from climbing tree. In another embodiment, smooth flashing that can't be penetrated by cat claws, preferably of metal, is placed around the base of any trees or poles in the enclosure which have branches or extremities that extend either to a structure which constitutes a boundary of the enclosure or that overhang or nearly overhang the fence or cooperate with branches of trees outside the enclosure to allow a cat to jump from tree to tree to escape the enclosure.

Referring now to the drawings, wherein like reference numerals designate identical or corresponding parts throughout the several views, and more particularly to FIG. 1 there of which shows a bracket 1 mounted near the top of a dog-eared fence 2 and a cable 3 weaved through netting 4 and attached to the fence by an appropriate attachment means 5. The netting is attached thus all around the yard.

Figure 2:
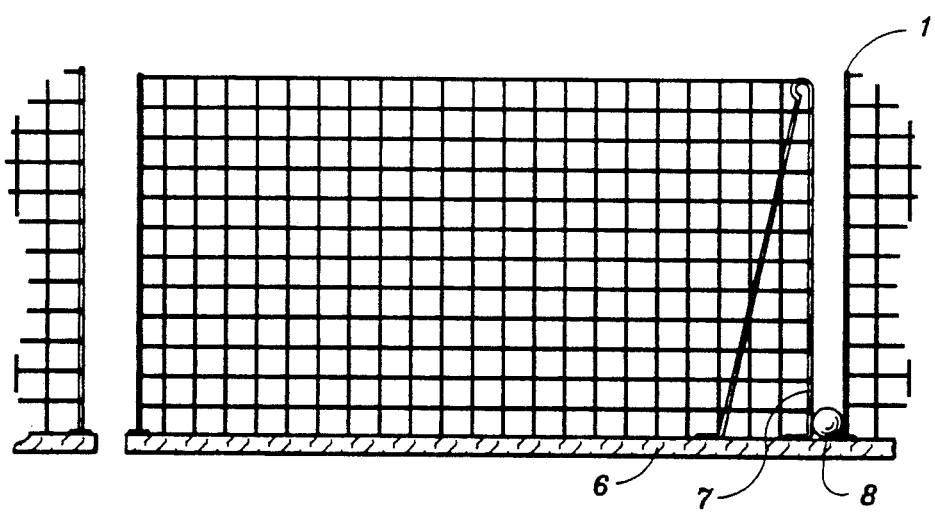
FIG. 2 is a top view of a system mounted on an inward opening gate.

FIG. 2 shows a top view of gate area having a gate 6 that swings inwardly about hinge 8 into the enclosure. A bracket 7 is mounted at a right angle to the position shown in FIG. 1. Bracket 7 is mounted slightly higher than bracket 1 so that bracket 7 and its netting will pass over bracket 1 and not interfere therewith when the gate is opened.

FIG. 3 shows a top view of gate area having a gate 6 that opens outwardly. A bracket 9 is mounted similarly to bracket 7 in FIG. 2 and slightly higher than bracket 10, however, bracket 9 is also mounted at an angle, as shown, in order to clear the edge of the fence 11 when the gate is opened and bracket 10 is mounted at an angle as shown so that brackets 9 and 10 are close together in order to prevent a cat from squeezing between them and escaping.

FIG. 4 shows an alternate embodiment which is more resistant to entry by unwanted cats. A vertical brace 12 is mounted at the rounded end of bracket 1 by an appropriate means 13. The vertical brace supports additional netting so that a cat on the fence 2 couldn't jump over the vertical netting and into the enclosure.

The invention contemplates a method of attachment for the vertical brace 12 to the bracket 1. One of the methods would be a folded piece of sheet metal or plastic clip having at least two bolts to pinch the vertical brace 12 and the bracket 1 so that the vertical brace could pivot about the loop in bracket 1 as shown in FIG. 4.

Another embodiment includes a U bolt of a diameter smaller than the loop in bracket 1 where the shank of the U bolt would fit around the shaft of the vertical brace 12 and a pair of washers or plate and nuts would provide the pinching force to grasp the brace 12 against the bracket 1 and still be capable of pivoting around the loop in bracket 1.

Obviously, numerous (additional) modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A fencing apparatus for keeping cats in an enclosed area comprising: a plurality of thin gauge brackets attached to a vertical fence at semi-regular intervals, a mesh netting attached to said brackets such that said netting extends horizontally outward from said vertical fence and is supported by said brackets, said netting being affixed by affixing means to said vertical fence at regular intervals between said brackets, wherein said affixing means comprises a cable weaved through said netting and attached to said fence by appropriate attachment means.

2. An apparatus as described in claim 1 further comprising a system having at least two brackets affixed to a gate in said vertical fence in such a manner that a first bracket being in closest proximity to a hinge in said gate is oriented such that it cooperates with a bracket mounted on said fence nearest thereto and does not impede the travel of said gate upon opening inward and a second bracket mounted on said gate farthest from said hinge and a bracket on said fence nearest thereto, both follow the arc of said gate in such a manner that it won't impede the travel of said gate upon opening outward.

3. An apparatus as described in claim 1 wherein said bracket comprises a first and second mounting means at a first end for mounting said bracket on said fence by appropriate affixing means, said mounting means providing support against movement in the vertical plane of said bracket and a pair of radii bent in to said bracket at a second end for rigidity.

4. An apparatus as described in claim 3 wherein said bracket comprises a first leg being mounted at a right angle to the plane of said fence and a second leg being mounted at an angle in excess of 45 degrees for supporting said bracket and netting.

5. An apparatus as described in claim 4 wherein said bracket comprises steal rod of a diameter having a range of $\frac{1}{4}''$ to $1/16''$.

6. An apparatus as described in claim 5 wherein said bracket comprises 3/16" steel rod.

7. An apparatus as described in claim 6 wherein said bracket extends from said fence for a distance having a range of 10"–24".

8. An apparatus as described in claim 7 wherein said bracket extends 16" from said fence.

9. An apparatus as described in claim 1 wherein said netting comprises polypropylene netting having fine strands and coarse mesh.

10. An apparatus as described in claim 1 wherein said thin gauge brackets are securely attached to said vertical fence, and, they are movable and unsteady in a horizontal plane parallel to a plane of said mesh netting.

11. An apparatus as described in claim 1 wherein said mesh netting extends loosely between said brackets and has slack so as to lack rigidity.

12. A system of keeping unwanted cats out of an enclosed area and cats in an enclosed area comprising a plurality of brackets mounted on a wooden vertical fence; netting affixed to said brackets which provide cantilevered support therefore; said netting being affixed to said fence by affixing means at a plurality of points between said brackets wherein said affixing means comprises a cable weaved through said netting and attached to said fence by appropriate attachment means.

13. A system as described in claim 12 further providing said netting around lower branches of trees and shrubs to prevent cats from climbing to jump said fence.

14. A system as described in claim 12 further comprising metal flashing affixed around the base of trees to prevent cats from climbing into said trees.

15. A system as described in claim 12 wherein said brackets are securely mounted on said wooden fence, and, they are movable and unsteady in a horizontal plane parallel to a plane of said mesh netting.

16. An apparatus as described in claim 12 wherein said mesh netting extends loosely between said brackets and has slack so as to lack rigidity.

17. A system of keeping unwanted cats out of an enclosed area and cats in an enclosed area comprising a plurality of brackets mounted on a wooden fence; netting affixed to said brackets which provide cantilevered support therefore; said netting being affixed to said fence by affixing means at a plurality of points between said brackets; further comprising a vertical brace attached to said brackets at an end opposite said fence in such a fashion as to allow pivoting about said attachment point in a plane of said bracket and netting attached to said vertical brace to form a vertical netting for preventing unwanted cats from leaping into said enclosure from atop of said fence.

* * * * *